United States Patent [19]
Brese et al.

[11] Patent Number: 5,643,496
[45] Date of Patent: Jul. 1, 1997

[54] SMALL SIZE ELECTROLUMINESCENT PHOSPHOR

[75] Inventors: Nathaniel E. Brese; Kenneth T. Reilly, both of Towanda, Pa.

[73] Assignee: OSRAM Sylvania Inc., Danvers, Mass.

[21] Appl. No.: 628,213

[22] Filed: Apr. 4, 1996

[51] Int. Cl.$^6$ .................... C09K 11/54; C09K 11/56; C09K 11/58

[52] U.S. Cl. .................... 252/301.65; 313/509; 313/503; 428/690

[58] Field of Search .................... 252/301.65; 313/509, 313/503; 428/690

[56] References Cited

U.S. PATENT DOCUMENTS

| | | | |
|---|---|---|---|
| 4,859,361 | 8/1989 | Reilly et al. | 252/301.6 S |
| 5,110,499 | 5/1992 | Reilly | 252/301.6 S |

FOREIGN PATENT DOCUMENTS

| | | |
|---|---|---|
| 426032 | 5/1991 | European Pat. Off. . |
| 5148481 | 6/1993 | Japan . |
| WO91/16722 | 10/1991 | WIPO . |

OTHER PUBLICATIONS

Kremheller et al., *J. Electrochem. Soc.*, v. 10, n. 11, pp. 891–895 (1960) Nov.

Faria, *J. Electrochem. Soc.*, v. 135, n. 10, pp. 2627–2630 (1988) Oct.

Lehmann, *J. Electrochem. Soc.*, v. 105, n. 10, pp. 585–588 (1958) Oct.

Goldberg et al., *J. Electrochem. Soc.*, v. 107, n. 6, pp. 521–526 (1958).

*Primary Examiner*—Melissa Bonner
*Attorney, Agent, or Firm*—Robert F. Clark

[57] ABSTRACT

An electroluminescent phosphor composed of copper activated zinc sulfide having an average particle size less than 23 micrometers and a halflife equal to or greater than the halflife of a second phosphor having a similar composition and an average particle size of at least 25 micrometers.

21 Claims, 3 Drawing Sheets

SMALL SIZE ELECTROLUMINESCENT PHOSPHOR

TECHNICAL FIELD

This invention relates to ZnS:Cu electroluminescent phosphors. More particularly, it relates to a small size ZnS:Cu electroluminescent phosphor having improved halflife and brightness characteristics.

BACKGROUND ART

Electroluminescent (EL) phosphors are incorporated into thick film AC electroluminescent devices used for backlighting liquid crystal displays (LCD), for automotive dashboard and control switch illumination, and for emergency egress lighting. Some important characteristics of these EL devices include brightness, color and halflife. Such characteristics depend inherently on the phosphors which are incorporated into the EL devices.

One particularly important class of EL phosphors are the copper-activated zinc sulfide phosphors, ZnS:Cu, which have commercially desirable brightness and color characteristics. Such phosphors may be blue, green or yellow-orange (co-activated with manganese) emitting. These phosphors may also contain other activators and coactivators such as Al, Cl and Br.

U.S. Pat. No. 4,859,361 to Reilly et al. and WO 91/16722 to Faria, which are hereby incorporated herein by reference, describe generally how to make copper-activated zinc sulfide phosphors. First, the phosphor precursor materials, ZnS, a copper source and a chloride flux are mixed together and heated in a first step firing to form a hexagonal ZnS material containing copper and chlorine ions. Next, the hexagonal ZnS is subjected to low intensity milling (or mulling) to convert some of the hexagonal ZnS to its cubic crystalline form. And finally, the milled material is then blended with zinc sulfate and copper sulfate and refired at a lower temperature to form an electroluminescent phosphor.

The particle size of the EL phosphor is an important consideration in the manufacture of EL devices. For fabrication techniques such as screen printing and for EL devices requiring thinner phosphor layers, it is desirable to use phosphors having smaller particle sizes. Small size phosphors may be obtained by screening phosphors produced according to known methods in order to eliminate the coarser fraction. Unfortunately, ZnS:Cu EL phosphor having an average particle size of less than 25 micrometers have been undesirable because of inferior brightness and halflife characteristics. In addition, screening the phosphors generates considerable waste in removing the oversize fraction which can be as much as 50% of the production lot.

Thus, it would be an advantage to provide a ZnS:Cu EL phosphor having an average particle size less than 25 micrometers in diameter and having better halflife and brightness characteristics. It would also be an advantage to produce small size EL phosphors without additional processing steps to reduce the particle size.

SUMMARY OF THE INVENTION

It is an object of the invention to obviate the disadvantages of the prior art.

It is a further object of the invention to provide a small size electroluminescent phosphor having a longer halflife and good brightness.

In accordance with one aspect the invention, there is provided an electroluminescent phosphor comprising copper activated zinc sulfide having an average particle size less than 23 micrometers and a halflife equal to or greater than the halflife of a second phosphor having a similar composition and an average particle size of at least 25 micrometers. Optionally the copper activated phosphor may be coactivated with manganese.

In accordance with another aspect of the invention, there is provided a method for making an electroluminescent phosphor comprising:

(a) combining zinc sulfide, a copper source, sulfur, a flux, and, optionally, zinc oxide to form a mixture;

(b) firing the mixture at a first temperature from about 1100° C. to about 1190° C. and for a first time from about 3 hours to about 7 hours to form a copper containing zinc sulfide having an average particle size less than 23 micrometers;

(c) milling the copper containing zinc sulfide to form a milled material;

(d) firing the milled material at a second temperature from 650° C. to about 750° C. for a time sufficient to form a copper activated zinc sulfide electroluminescent phosphor.

In accordance with a yet another aspect of the invention, there is provided an electroluminescent lamp comprising a first electrode, a first layer of a dielectric material adjacent to the first electrode, a second layer of a dielectric material adjacent to the first layer, the second layer containing an electroluminescent phosphor having an average particle size less than 23 micrometers and a halflife equal to or greater than the halflife of a second phosphor having the same composition, and a second electrode adjacent to the second layer of dielectric material.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

It has been found that a small size ZnS:Cu EL phosphor having an average particle size of less than about 23 micrometers can be produced without additional processing steps by manipulating the first step firing time and temperature. The smaller phosphor exhibits a higher efficiency (lumens/watt) because of its smaller particle size and has better brightness and halflife characteristic than can be achieved by other methods such as sieving.

Figure 1:
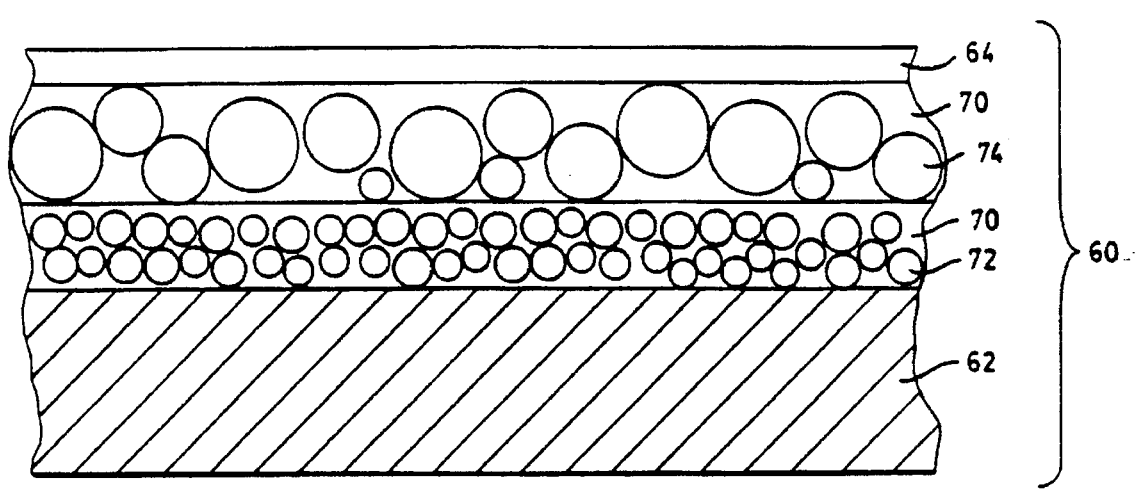
FIG. 1 is a schematic illustration of the structure of an electroluminescent lamp.

FIG. 1 is a schematic representation of the structure of an electroluminescent lamp 60. A conductive substrate material, such as aluminum or graphite, forms a first electrode 62 of the lamp 60, while a transparent conductive film, such as indium tin oxide, forms a second electrode 64. Sandwiched between the two conductive electrodes 62 and 64 are two additional layers of dielectric material 70 which can be, for example, cyanoethyl cellulose or cyanoethyl starch. Adjacent to the first electrode 62 is a layer of dielectric material 70 in which may be embedded particles of a ferroelectric material 72 such as barium titanate. Adjacent to the second electrode 64 is a layer of dielectric material 70 in which may be embedded particles of the electroluminescent phosphor 74 of this invention.

The halflife of an electrolumuminescent lamp as used herein is defined as the time it takes for the brightness of the EL lamp to reach half its initial value. The initial brightness of the lamp is typically measured after a 24 hour burn-in period. The burn-in period is used to stabilize the brightness of the lamp and increase the reproducibility of the measurement. Brightness is typically measured in footlamberts (fL) at conditions of 100 volts and 400 hertz.

The following non-limiting examples are provided:

Blue-green emitting ZnS:Cu,Cl EL phosphors similar to Type 723 ($x=0.176\pm0.020$, $y=0.400\pm0.030$) manufactured by OSRAM SYLVANIA INC., Towanda, Pa. were made according to the following method. Laboratory scale samples were made by blending 454 g of luminescent grade S-10 ZnS containing approx. 1 wt. % chloride from OSRAM SYLVANIA INC. with 0.682 g $CuSO_4$, 36.32 g S, 2.27 g ZnO, 13.62 g $BaCl_2$, 13.62 g $MgCl_2$ and 9.08 g NaCl. The ZnS "S-10" has an average particle size of 5–10 micrometers. The $BaCl_2$, $MgCl_2$ and NaCl are flux materials. The mixtures were fired in covered crucibles for 3–7 hours at 1100–1250° C. The fired material was removed from the furnace and washed multiple times (approx. 5 times) with hot deionized (DI) water to remove the flux. This was done by dispersing the fired cake in 1.8 l of hot DI water and stirring for 2 minutes. After settling, the water was decanted and replaced with another 1.8 l of hot DI water. The washing was repeated until no chloride ions could be detected in the supernate by adding 0.1M $AgNO_3$ to form a AgCl precipitate. The washed material was mulled for 30 minutes in a 12" Cinncinnati muller. The mulled material was blended with $ZnSO_4 \cdot 7H_2O$ and $CuSO_4$ in the ratio of 19.146 g of $ZnSO_4 \cdot 7H_2O$ and 1.875 g of $CuSO_4$ per every 75 g of mulled material and fired in a second step firing for about 2¼ hours at either about 685° C. or about 730° C. Halflife and efficiency appear to optimum when using a second step firing temperature of about 730° C. After cooling, the phosphor was washed twice with hot deionized (DI) water, twice with acetic acid (149 ml glacial acetic acid in 782 ml hot DI water), three additional times with hot DI water, once with a KCN solution (37.5 g KCN in 782 ml hot DI water), and three final times with hot DI water. The final phosphor was collected by filtration, dried and sieved to −325 mesh.

Green emitting ZnS:Cu,Cl EL phosphors similar to OSRAM SYLVANIA Type 728 phosphor ($x=0.182\pm0.020$, $y=0.455\pm0.030$) were made by increasing the copper content of the initial formulation. The amounts of the starting materials were the same except, 0.970 g $Cu_2SO_4$, 15.0 g $BaCl_2$, 75.0 g $MgCl_2$, and 5.0 g NaCl were used. The blended formulation was processed by the above method.

Figure 2:
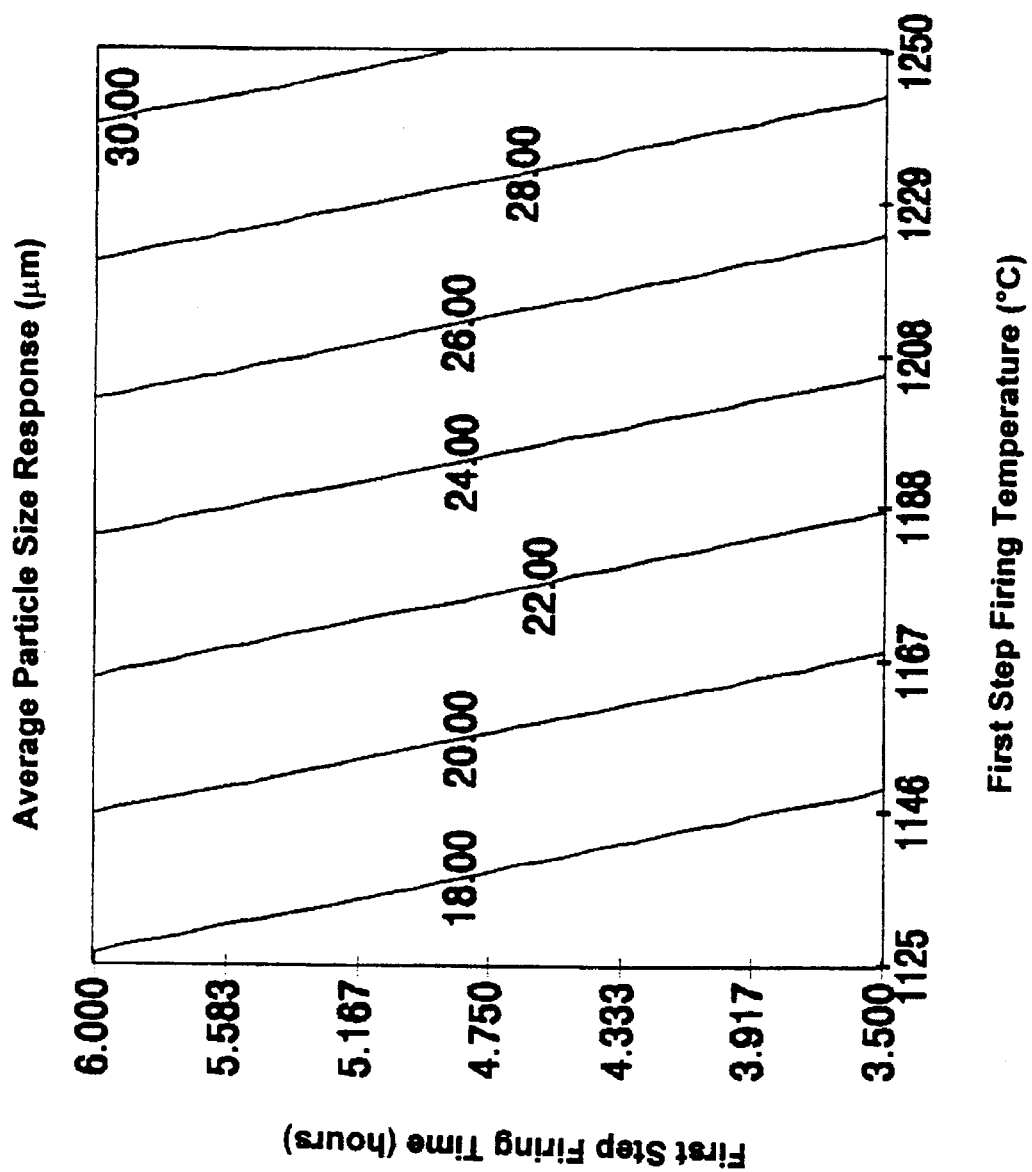
FIG. 2 is a graphical illustration of the effect of the first step firing time and temperature on the average particle size of a ZnS:Cu,Cl phosphor.

The effect of the first step firing temperature and time on the average particle size of the final ZnS:Cu,Cl phosphors is shown in Table 1 and FIG. 2. Particle sizes were determined by Coulter Counter. As shown in Table 1, the particle sizes of the phosphors of the present invention include ones having an average particle size less than 23 micrometers, (see samples 69-2, 22-4, 72-3 and 76-1) and ones having an average particle size of less than 21 micrometers (see samples 69-2, 22-4, and 76-1). The phosphors in Table 1 were incorporated into electroluminescent lamps and their luminescent properties measured under similar operating conditions. The data from these lamps are given in Table 2. Lamps were operated at 100 V and 400 Hz. As demonstrated by the results in Table 2 the electroluminescent phosphor of the present invention has a halflife of at least 300 hours and even greater, namely a halflife of at least 340 hours, and a halflife of at least 380 hours. In addition ones of those phosphors showed an initial brightness of at least 24 fL (see samples 22-4, 72-3 and 76-1) and also an initial brightness of at least 28 fL (see sample 69-2).

TABLE 1

| Phosphor Sample | SYLVANIA TYPE | First Step Firing Temperature | First Step Firing Time | Second Step Firing Temperature | Average Particle Size (μm) |
| --- | --- | --- | --- | --- | --- |
| 69-1 | 723 | 1204° C. | 5.25 hours | 730° C. | 27.3 |
| 69-2 | 723 | 1160° C. | 3.7 hours | 685° C. | 20.9 |
| 22-4 | 723 | 1160° C. | 3.7 hours | 730° C. | 19.4 |
| 72-1 | 728 | 1204° C. | 5.25 hours | 685° C. | 27.2 |
| 72-3 | 728 | 1180° C. | 4.0 hours | 685° C. | 21.2 |
| 76-1 | 728 | 1160° C. | 3.7 hours | 730° C. | 20.5 |

TABLE 2

| Phosphor Sample | SYLVANIA TYPE | x, y color coordinates | Initial Brightness (fL) | Halflife (hours) |
| --- | --- | --- | --- | --- |
| 69-1 | 723 | 0.177, 0.421 | 33.6 | 1082 |
| 69-2 | 723 | 0.172, 0.396 | 28.3 | 341 |
| 22-4 | 723 | 0.177, 0.410 | 24.4 | 384 |
| 72-1 | 728 | 0.186, 0.469 | 27.8 | 918 |
| 72-3 | 728 | 0.179, 0.457 | 26.9 | 415 |
| 76-1 | 728 | 0.184, 0.452 | 27.4 | 407 |

FIG. 2 is a comprehensive graphical illustration of the effect of the first step firing time and temperature on the average particle size of the phosphor. The preferred first step firing temperature range is from about 1100° C. to about 1190° C. with the more preferred temperature being about 1160° C. The preferred first step firing time range is from about 3.5 to about 6 hours with the more preferred time being about 3.7 hours. Analysis of the particle size before and after second step firing indicates that no further particle growth occurs during the second step firing. Other experiments on Type 723 phosphors has indicated that further improvements in brightness, halflife and efficiency can realized eliminating ZnO from the initial phosphor formulation or by reducing the amount of flux used by up to one-third. However, these effects do not appear to be additive.

For Type 728 phosphors, brightness and life may be further improved by adding up to 0.025M of $ZnCl_2$ to the initial formulation prior to the first step firing. The data in Table 3 demonstrate the effect of the $ZnCl_2$ addition. The first step firing time and temperature were 1160° C. for 3.7 hours. The second step firing temperature and time were 730° C. for 2.25 hours.

TABLE 3

Effect of ZnCl₂ Addition on Type 728 Phosphors

| Phosphor Sample | Moles of $ZnCl_2$ | Average Particle Size (μm) | x, y color coordinates | Initial Brightness (fL) | Halflife (hours) |
|---|---|---|---|---|---|
| 76-1 | 0 | 20.5 | 0.184, 0.452 | 27.4 | 407 |
| 76-2 | 0.001 | 22.6 | 0.188, 0.458 | 25.6 | 412 |
| 76-3 | 0.005 | 20.7 | 0.186, 0.444 | 30.5 | 443 |
| 76-4 | 0.025 | 21.4 | 0.186, 0.444 | 29.7 | 483 |

Type 723 ZnS:Cu,Cl phosphors were made on a production scale using the method described above. In the first step, 15875.8 g ZnS "S-10" containing approx. 1 wt. % chloride, 23.87 g $Cu_2SO_4$, 476.3 g $BaCl_2$, 476.3 g $MgCl_2$, 317.5 g NaCl, 1270.1 g S, and 79.45 g ZnO were blended and fired. After removing the flux, 35 lb. amounts of the washed material was mulled for 85 minutes. The mulled material was blended with $ZnSO_4 \cdot 7H_2O$ and $CuSO_4$ in the ratio of 1159 g of $ZnSO_4 \cdot 7H_2O$ and 113.5 g of $CuSO_4$ per every 10 lbs. of mulled material. The blended material was fired, washed and finished using the same steps as above. A portion of lot A was further sieved to −500 mesh to form lot B. The phosphors were incorporated into conventional thick film EL devices and evaluated for brightness, halflife and color. The results of which are given in Table 4.

TABLE 4

| Lot | Phosphor | First Step Firing Conditions | Average Particle Size (μm) | x, y color coordinates | Initial Brightness (fL) | Halflife (hours) |
|---|---|---|---|---|---|---|
| A | Std. ZnS: Cu, Cl* | 1204° C., 5.25 h. | 27.2 | 0.173, 0.393 | 29.5 | 340 |
| B | Std. ZnS: Cu, Cl (−500 mesh)* | 1204° C., 5.25 h. | 23.5 | 0.171, 0.374 | 26.6 | 260 |
| C | Small Size ZnS: Cu, Cl** | 1160° C., 3.7 h. | 22.9 | 0.175, 0.405 | 30.4 | 390 |

*730° C. 2nd step firing temp; average of 7 production lots.
**685° C. 2nd step firing temp.

The data for the standard ZnS:Cu,Cl phosphors, lots A and B, in Table 4 clearly demonstrate the loss of halflife and brightness which the prior art expects for smaller particle sizes (−500 mesh, lot B). In contrast, the small size ZnS:Cu, Cl, lot C, shows the unexpected improvement in halflife for phosphors prepared using the lower first step firing time and temperature. Additionally, the brightness and color coordinates are comparable to the standard ZnS:Cu,Cl, lot A, which has a larger average particle size.

Figure 3:
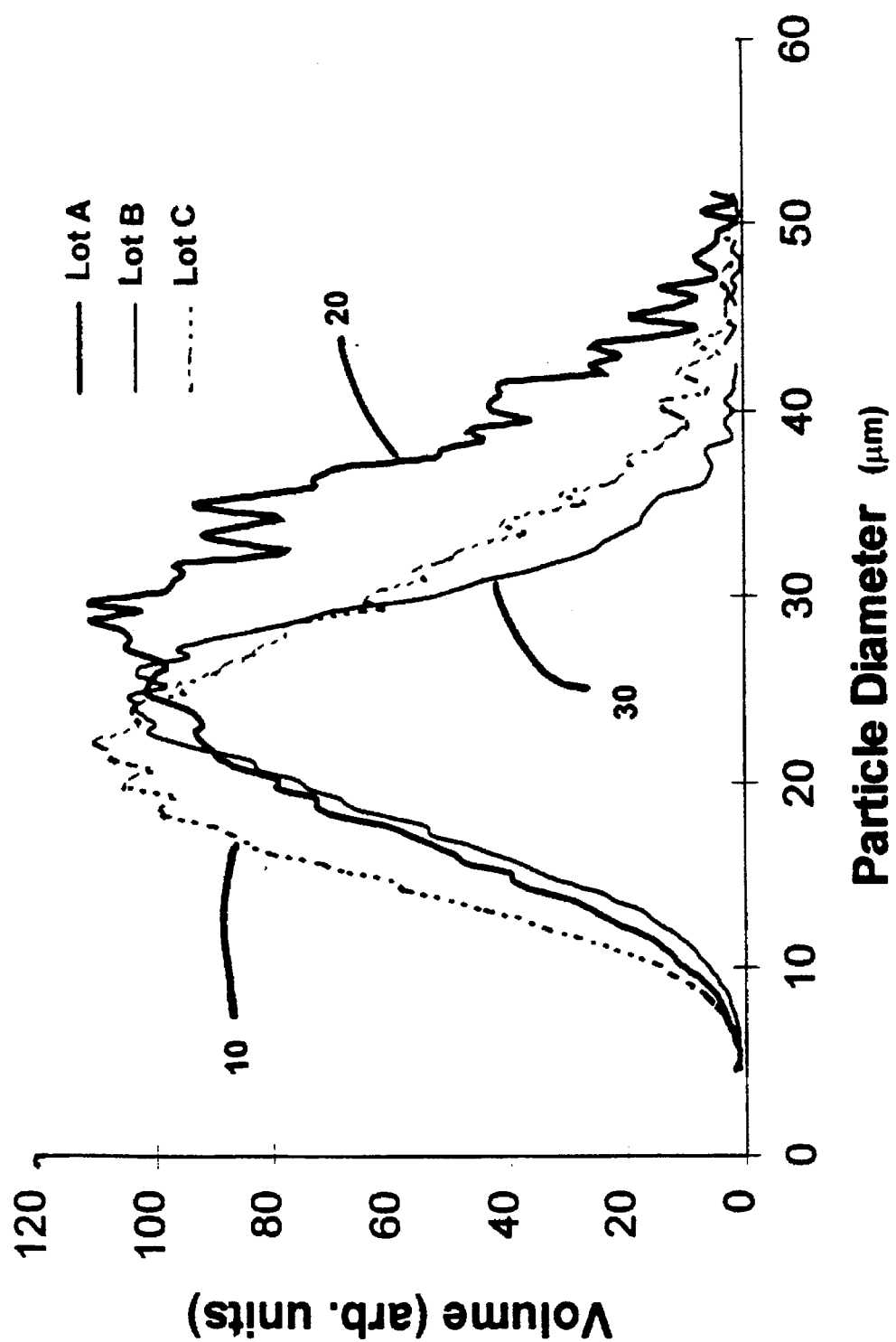
FIG. 3 is a comparison of the particle size distributions of similar ZnS:Cu,Cl phosphors.

In FIG. 3, the particle size distribution for the small size phosphor, lot C, from Table 4 is compared with the distributions typical for the standard Type 723 phosphors made using first step firing conditions of 1204° C. and 5.25 hours. Curve 20 represents the particle size distribution for the standard Type 723 production. Curve 30 represents the particle size distribution for the standard Type 723 after sieving to −500 mesh. Curve 10 demonstrates that the particle size distribution of the small size phosphor, lot C, has approximately the same width as the −500 mesh phosphor but has a slighter lower average particle size. Both the small size phosphor, lot C, and the −500 mesh material have particle size distributions which are noticeably narrower than the standard Type 723 material.

The halflife and efficiency of the small size phosphor may be further increased by coating the individual phosphor particles with a protective coating. Such a protective coating is described in U.S. Pat. No. 5,220,243 to Klinedinst et al. which is incorporated herein by reference. Samples of the small size ZnS:Cu,Cl, lot C, were coated with a coating of hydrolyzed trimethylaluminum and incorporated into lamps. The improvement in halflife and efficiency is evident in Table 5.

TABLE 5

| Sample | Halflife (hours) | Efficiency (lumens/watt) |
|---|---|---|
| Lot C, uncoated | 390 | 5.5 |
| Lot C, coated | 580 | 6.4 |

While there has been shown and described what are at the present considered the preferred embodiments of the invention, it will be obvious to those skilled in the art that various changes and modifications may be made therein without departing from the scope of the invention as defined by the appended claims.

We claim:

1. An electroluminescent phosphor comprising copper activated zinc sulfide having an average particle size less than 23 micrometers and a halflife equal to or greater than the halflife of a second phosphor having a similar composition and an average particle size of at least 25 micrometers.

2. The electroluminescent phosphor of claim 1 wherein the average particle size is less than 21 micrometers.

3. The electroluminescent phosphor of claim 1 wherein the phosphor has an initial brightness which is equal to or greater than the initial brightness of the second phosphor.

4. An electroluminescent phosphor comprising copper and chlorine activated zinc sulfide having x and y color coordinates where x is 0.176±0.020 and y is 0.400±0.030, an average particle size less than 23 micrometers and a halflife of at least 300 hours.

5. The electroluminescent phosphor of claim 4 wherein the phosphor has a halflife of at least 340 hours.

6. The electroluminescent phosphor of claim 4 wherein the phosphor has a halflife of at least 380 hours.

7. The electroluminescent phosphor of claim 4 wherein the phosphor has an initial brightness of at least 24 fL.

8. The electroluminescent phosphor of claim 4 wherein the phosphor has an initial brightness of at least 28 fL.

9. The electroluminescent phosphor of claim 4 wherein x is 0.182±0.020 and y is 0.455±0.030.

10. The electroluminescent phosphor of claim 9 wherein the phosphor has a halflife of at least 340 hours.

11. The electroluminescent phosphor of claim 9 wherein the phosphor has a halflife of at least 380 hours.

12. The electroluminescent phosphor of claim 9 wherein the phosphor has an initial brightness of at least 24 fL.

13. The electroluminescent phosphor of claim 9 wherein the phosphor has an initial brightness of at least 28 fL.

14. A method for making an electroluminescent phosphor comprising:

(a) combining zinc sulfide, a copper source, sulfur, a flux, and, optionally, zinc oxide to form a mixture;

(b) firing the mixture at a first temperature from about 1100° C. to about 1190° C. and for a first time from about 3 hours to about 7 hours to form a copper containing zinc sulfide having an average particle size less than 23 micrometers;

(c) milling the copper containing zinc sulfide to form a milled material;

(d) firing the milled material at a second temperature from 650° C. to about 750° C. for a time sufficient to form a copper activated zinc sulfide electroluminescent phosphor.

15. The method of claim 14 wherein the first temperature is 1160° C. and the first time is 3.7 hours.

16. The method of claim 15 wherein the second temperature is 730° C.

17. The method of claim 14 wherein the mixture further comprises zinc chloride.

18. An electroluminescent lamp comprising a first electrode, a first layer of a dielectric material adjacent to the first electrode, a second layer of a dielectric material adjacent to the first layer, the second layer containing an electroluminescent phosphor having an average particle size less than 23 micrometers and a halflife equal to or greater than the halflife of a second phosphor having the same composition, and a second electrode adjacent to the second layer of dielectric material.

19. The electroluminescent lamp of claim 18 wherein the average particle size of the electroluminescent phosphor is less than 21 micrometers.

20. The electroluminescent phosphor of claim 1 wherein the phosphor is coactivated with manganese.

21. The electroluminescent phosphor of claim 1 wherein the individual phosphor particles are coated with a protective coating.

* * * * *